United States Patent
Mixter et al.

(10) Patent No.: US 11,023,051 B2
(45) Date of Patent: Jun. 1, 2021

(54) SELECTIVE DETECTION OF VISUAL CUES FOR AUTOMATED ASSISTANTS

(71) Applicant: Google LLC, Mountain View, CA (US)

(72) Inventors: Kenneth Mixter, Los Altos Hills, CA (US); Yuan Yuan, Redwood City, CA (US); Tuan Nguyen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 16 days.

(21) Appl. No.: 16/617,592

(22) PCT Filed: May 4, 2018

(86) PCT No.: PCT/US2018/031168
§ 371 (c)(1),
(2) Date: Nov. 27, 2019

(87) PCT Pub. No.: WO2019/212568
PCT Pub. Date: Nov. 7, 2019

(65) Prior Publication Data
US 2020/0103978 A1    Apr. 2, 2020

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/012* (2013.01); *G06F 3/013* (2013.01); *G06F 3/0304* (2013.01);
(Continued)

(58) Field of Classification Search
None
See application file for complete search history.

(56) References Cited

U.S. PATENT DOCUMENTS

| 7,274,803 B1* | 9/2007 | Sharma | G06K 9/00375 |
| | | | 348/14.15 |
| 8,577,135 B2* | 11/2013 | Garg | G06T 7/90 |
| | | | 382/165 |

(Continued)

OTHER PUBLICATIONS

Wong, Y. et al., "Patch-based Probabilistic Image Quality Assessment for Face Selection and Improved Video-based Face Recognition," arXiv:1304.0869v2 [cs.CV] IEEE Conference on Computer Vision and pattern Recognition Workshops (CVPRW), 8 pages 2011.

(Continued)

*Primary Examiner* — Hua Lu
(74) *Attorney, Agent, or Firm* — Middleton Reutlinger (57) ABSTRACT

Techniques are described herein for reducing false positives in vision sensor-equipped assistant devices. In various implementations, initial image frame(s) may be obtained from vision sensor(s) of an assistant device and analyzed to classify a particular region of the initial image frames as being likely to contain visual noise. Subsequent image frame(s) obtained from the vision sensor(s) may then be analyzed to detect actionable user-provided visual cue(s), in a manner that reduces or eliminates false positives. In some implementations, no analysis may be performed on the particular region of the subsequent image frame(s). Additionally or alternatively, in some implementations, a first candidate visual cue detected within the particular region may be weighted less heavily than a second candidate visual cue detected elsewhere in the one or more subsequent image frames. An automated assistant may then take responsive action based on the detected actionable visual cue(s).

15 Claims, 6 Drawing Sheets

(51) Int. Cl.
*G06T 7/70* (2017.01)
*G06F 3/03* (2006.01)
*G06F 3/16* (2006.01)
*G06K 9/00* (2006.01)
*G06K 9/03* (2006.01)
*G06K 9/20* (2006.01)
*G06K 9/62* (2006.01)

(52) U.S. Cl.
CPC ......... *G06F 3/167* (2013.01); *G06K 9/00302* (2013.01); *G06K 9/00335* (2013.01); *G06K 9/036* (2013.01); *G06K 9/2081* (2013.01); *G06K 9/6267* (2013.01); *G06T 7/70* (2017.01); *G06T 2207/30196* (2013.01)

(56) References Cited

U.S. PATENT DOCUMENTS

| | | | |
|---|---|---|---|
| 8,750,573 B2 | 6/2014 | Ming-Chang et al. | |
| 8,891,868 B1 | 11/2014 | Ivanchenko | |
| 9,292,092 B2 | 3/2016 | Yuxin et al. | |
| 9,417,700 B2* | 8/2016 | El Dokor | G06K 9/3216 |
| 9,678,713 B2 | 6/2017 | Dimitriadis et al. | |
| 2008/0082426 A1* | 4/2008 | Gokturk | G06K 9/62 705/26.62 |
| 2009/0129675 A1* | 5/2009 | Eggert | G06T 7/215 382/173 |
| 2009/0324081 A1* | 12/2009 | Oh | G06K 9/325 382/177 |
| 2011/0175810 A1* | 7/2011 | Markovic | G06F 3/011 345/158 |
| 2012/0274755 A1* | 11/2012 | Sinha | G06K 9/00369 348/77 |
| 2012/0278077 A1* | 11/2012 | Zhang | G06K 9/6256 704/250 |
| 2013/0101223 A1* | 4/2013 | Kawanishi | G06K 9/46 382/195 |
| 2014/0098240 A1* | 4/2014 | Dimitriadis | H04N 21/42203 348/169 |
| 2015/0036884 A1* | 2/2015 | Ivanchenko | G06K 9/00 382/103 |
| 2015/0228081 A1* | 8/2015 | Kim | H04N 13/282 348/47 |
| 2017/0154273 A1* | 6/2017 | Guttmann | H04L 67/10 |
| 2017/0351905 A1* | 12/2017 | Wang | G06K 9/00241 |
| 2017/0374272 A1* | 12/2017 | Tsuji | G06T 7/73 |
| 2019/0052524 A1* | 2/2019 | Kim | H04L 41/0869 |
| 2019/0056781 A1* | 2/2019 | Liu | G06K 9/00617 |

OTHER PUBLICATIONS

Li, "Hand Gesture Recognition Using Kinect," A Thesis submitted to the faculty of the J.B. Speed School of Engineering of the University of Louisville, Department of Computer Engineering and Computer Sciences, 44 pages Apr. 9, 2012.

Choo et al., "Statistical Analysis-Based Error Models for the Microsoft Kinect Depth Sensor," Sensors 2014, 14, 17430-17450; doi: 103390/s140917430, ISSN: 1424-8220, www.mdpi.com/journal/sensors. 21 pages May 21, 2014.

European Patent Office; International Search Report and Written Opinion of Ser. No. PCT/US2018/031168; 14 pages; dated Oct. 11, 2018.

European Patent Office: Intention to Grant issued for Application No. 18728483.1 dated Aug. 17, 2020.

European Patent Office; Communication issued in Application No. 20212478.0; 11 pages.; dated Mar. 16, 2021.

* cited by examiner

SELECTIVE DETECTION OF VISUAL CUES FOR AUTOMATED ASSISTANTS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. In many cases, the automated assistant must first be "invoked," e.g., using predefined oral invocation phrases.

SUMMARY

As automated assistants because more ubiquitous, computing devices may be specifically designed to facilitate interaction with automated assistants—referred to herein as "assistant devices". Assistant devices may enable users to engage in touch-free interaction with automated assistants. For example, assistant devices may include microphones that allow users to provide vocal utterances as input. Additionally, assistant devices may include vision sensors such as cameras, passive infrared ("PIR") sensors, etc., that can detect presence, gestures, etc.

On vision sensor-equipped assistant devices, an automated assistant may be invoked by one or more predetermined visual cues provided by users, such as gestures, alone or in combination with vocal utterances. For example, a relatively subtle visual cue like a user's gaze being directed at a particular reference point (e.g., directly at the vision sensor) may be used in combination with a vocal utterance from the user to invoke the automated assistant. Additionally or alternatively, less subtle gestures, such as hand waving at the vision sensor, a predetermined gesture (e.g., forming a predetermined shape with the user's hand), and so forth, may alone (or in combination with vocal utterances) be used to invoke the automated assistant. In addition, user-provided visual cues may be interpreted by an automated assistant to take a variety of different actions post-invocation. For example, a user's "thumbs up" signal may be interpreted as an affirmative response to a question posed by the automated assistant.

One challenge with vision sensor-equipped assistant devices is false positives. For example, suppose a source of visual content such as a television, photograph, or other image (animated or still) is visible within an assistant device's field of view. The visual content provided by that source may be mistaken for a visual cue designed to invoke an automated assistant and/or to cause the automated assistant to perform an action. As an example, suppose an automated assistant engaged with a user on a vision sensor-equipped assistant device poses a question seeking a yes/no answer from the user, such as "Are you sure you want me to place this order?" Suppose further that on a television visible in the assistant device's field of view, a television character happens to give a thumbs up gesture right after the question is posed but before the user has a chance to respond. There is a reasonable chance the thumbs up gesture will be detected and interpreted as an affirmative response from the user. This may be particularly troublesome to the user if they have changed their mind about sharing the placing the order and may, as outlined further below, present a security risk. Furthermore, as also described below, the computing apparatus used for implementing the assistant, as well as those used in associated third party services, may suffer from unwanted and unnecessary usage of their computing resources following the false positive. The false positive may also, for example, cause unwanted power usage within the system.

Techniques are described herein for reducing and/or eliminating false positives in vision sensor-equipped assistant devices. In some implementations, regions of image frames captured by an assistant device may be classified as being likely to contain visual noise and/or unlikely to contain a visual cue. Later, when analyzing subsequent image frames captured by the assistant device, those same regions may be ignored, or at least weighted less heavily than other regions, when attempting to detect user-provided visual cues. This may reduce or eliminate false positive visual cues generated by, for example, televisions, computer screens, still images, etc.

In a process that will be referred to herein as "excluded region classification," regions of image frames (or, put another way, regions of a vision sensor's field of view) may be classified as being likely to contain visual noise and/or unlikely to contain user-provided visual cues at various times using a variety of techniques. In various implementations, excluded region classification may be performed when an assistant device is initially placed at a location (e.g., a tabletop or countertop), whenever the assistant device is moved, and/or if the vision sensor of the assistant device is adjusted (e.g., panned, tilted, zoomed). Additionally or alternatively, in some implementations, excluded region classification may be performed periodically, e.g., every day, every week, etc., to account for changes to an environment (e.g., a television or computer being repositioned, removed, etc.). In some implementations, excluded region classification may be performed in response to other stimuli, such as a change in lighting (e.g., daytime versus nighttime), a determination that a television or computer has been turned off (in which case it is no longer likely to raise false positives), a determination that a television or computer (particularly a laptop or tablet) has been moved, a time of day (e.g., television might be less likely to be on in the middle of night or while a user is at work), etc.

Various techniques may be employed to perform excluded region classification. In some implementations, a machine learning model such as a convolutional neural network may be trained to identify, in image frames captured by an assistant device, objects that are likely to generate false positives, such as televisions, computer screens, projection screens, still images (e.g., photographs on the wall), electronic picture frames, and so forth. Then, regions of interest ("ROI") may be generated that encompass the potential sources of false positives. These ROIs may be ignored, or visual cues detected in these regions may be viewed skeptically, during subsequent analysis to detect user-provided visual cues.

Other conventional object recognition techniques may also be employed, such as approaches that rely on computer-aided design ("CAD") models, feature-based methods (e.g., surface patches, linear edges), appearance based methods (e.g., edge matching, divide-and-conquer, gradient matching, histograms, etc.), genetic algorithms, and so forth. Additionally or alternatively, for objects such as televisions or computer screens, other techniques may be employed to recognize these objects. In some implementations, a television may be identified in a sequence of image frames based on a display frequency of the television. Suppose the sequence of image frames is captured at twice the frequency rate of a typical television. In every other image frame of the sequence of image frames, a new image would appear on the television. This may be detected and used to determine an ROI of the television that can be ignored and/or weighted less heavily.

Objects that might interfere with detection of visual cues, such as televisions or computer screens, may not always generate noise. For example, if a television is off, then it cannot render graphics that might interfere with visual cue detection. Accordingly, in some implementations, an automated assistant (or another process associated therewith) may be able to determine whether a television is currently rendering graphics (and therefore poses a risk of raising a false positive visual cue). For example, in implementations in which a television is detected based on its display frequency, the lack of such frequency detection may be interpreted as meaning the television is not currently rendering graphics. Additionally or alternatively, in some implementations, the television may be a "smart" television that is in network communication with the automated assistant, e.g., by virtue of the television being part of the same coordinated "ecosystem" of client devices that includes the assistant device that is attempting to detect visual cues. In some such implementations, the automated assistant may be able to determine a state of the television, e.g., "on," "off," "active," "sleep," "screen saver," etc., and may include or exclude the television's ROI based on that determination.

When subsequent image frames are captured by the assistant device, regions (i.e. two-dimensional spatial portions) of those subsequent image frames that were previously classified as being likely to contain visual noise and/or unlikely to contain user-provided visual cues may be dealt with in various ways. In some implementations those classified regions may simply be ignored (e.g., analysis of those subsequent image frames may refrain from analyzing those regions). Additionally or alternatively, in some implementations, candidate visual cues (e.g., hand gestures, gazes, etc.) detected in those classified regions may be weighted less heavily than, for instance, candidate visual cues detected elsewhere in the subsequent image frames.

Techniques described herein may give rise to a variety of technical advantages and benefits. As one example, disregarding classified regions of image frames may conserve computing resources, e.g., by leaving processor(s) available to focus on regions that are more likely to contain visual cues. As another example, false positives may trigger automated assistants and/or assistant devices to take various actions that waste computing resources and/or power, and that potentially confuse or even frustrate users. Such wastage or otherwise inefficient or unnecessary use of power and computing resources may occur at the assistant device itself (e.g. a client device) and/or at a remote computing apparatus, such as one or more network servers, with which the assistant device communicates to perform the various actions. In addition, unnecessary communication with a remote computing apparatus causes unwanted load on the communication network. Techniques described herein reduce the number of false positives of detected visual cues. Techniques described herein also provide advantages from a security standpoint. For example, malicious users might remotely commandeer a television or computer screen in order to render visual cue(s) that might trigger unwanted responsive action (e.g., turning on a camera, unlocking a door, etc.) by an automated assistant and/or an assistant device. By ignoring (or at least weighting less heavily) regions of image frames that contain televisions/computer screens, such security breaches may be thwarted.

In some implementations, a method is provided that is performed by one or more processors that facilitate touch-free interaction between one or more users and an automated assistant. The method includes obtaining one or more initial image frames from one or more vision sensors and analyzing the one or more initial image frames to classify a particular region of the one or more initial image frames as likely to contain visual noise. The method further includes obtaining one or more subsequent image frames from the one or more vision sensors and analyzing the one or more subsequent image frames to detect one or more actionable visual cues provided by one or more of the users. Analyzing the one or more subsequent image frames includes: refraining from analyzing the particular region of the one or more subsequent image frames, or weighting a first candidate visual cue detected within the particular region of the one or more subsequent image frames less heavily than a second candidate visual cue detected elsewhere in the one or more subsequent image frames. The method further includes causing the automated assistant to take one or more responsive actions based on one or more of the detected actionable visual cues.

These and other implementations of the technology disclosed herein can include one or more of the following features.

In some implementations, analyzing the one or more initial image frames includes detecting an electronic display captured in the one or more initial image frames, and the particular region of the one or more image frames contains the detected electronic display. In some versions of those implementations, the electronic display is detected using an object recognition process. In some additional or alternative versions of those implementations, detecting the electronic display includes detecting a display frequency of the electronic display. In yet further additional or alternative versions, the refraining or weighting is performed conditionally based on a determination of whether the electronic display is currently rendering graphics.

In some implementations, analyzing the one or more initial image frames includes detecting a picture frame captured in the one or more initial image frames, and the particular region of the one or more image frames contains the detected picture frame.

In some implementations, the one or more responsive actions include invocation of the automated assistant, and the automated assistant is invoked based on the one or more detected actionable visual cues in conjunction with an utterance from one or more of the users.

In some implementations, the one or more responsive actions include invocation of the automated assistant, and the automated assistant is invoked solely based on the one or more detected actionable visual cues.

In some implementations, the one or more detected actionable visual cues include: a user looking towards a reference point, a user making a hand gesture, a user having a particular facial expression, and/or a position of the user within the one or more subsequent image frames.

In some implementations, analyzing the one or more initial image frames to classify the particular region of the one or more initial image frames as likely to contain visual noise includes associating the particular region of the one or more initial image frames with a visual noise indicator.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
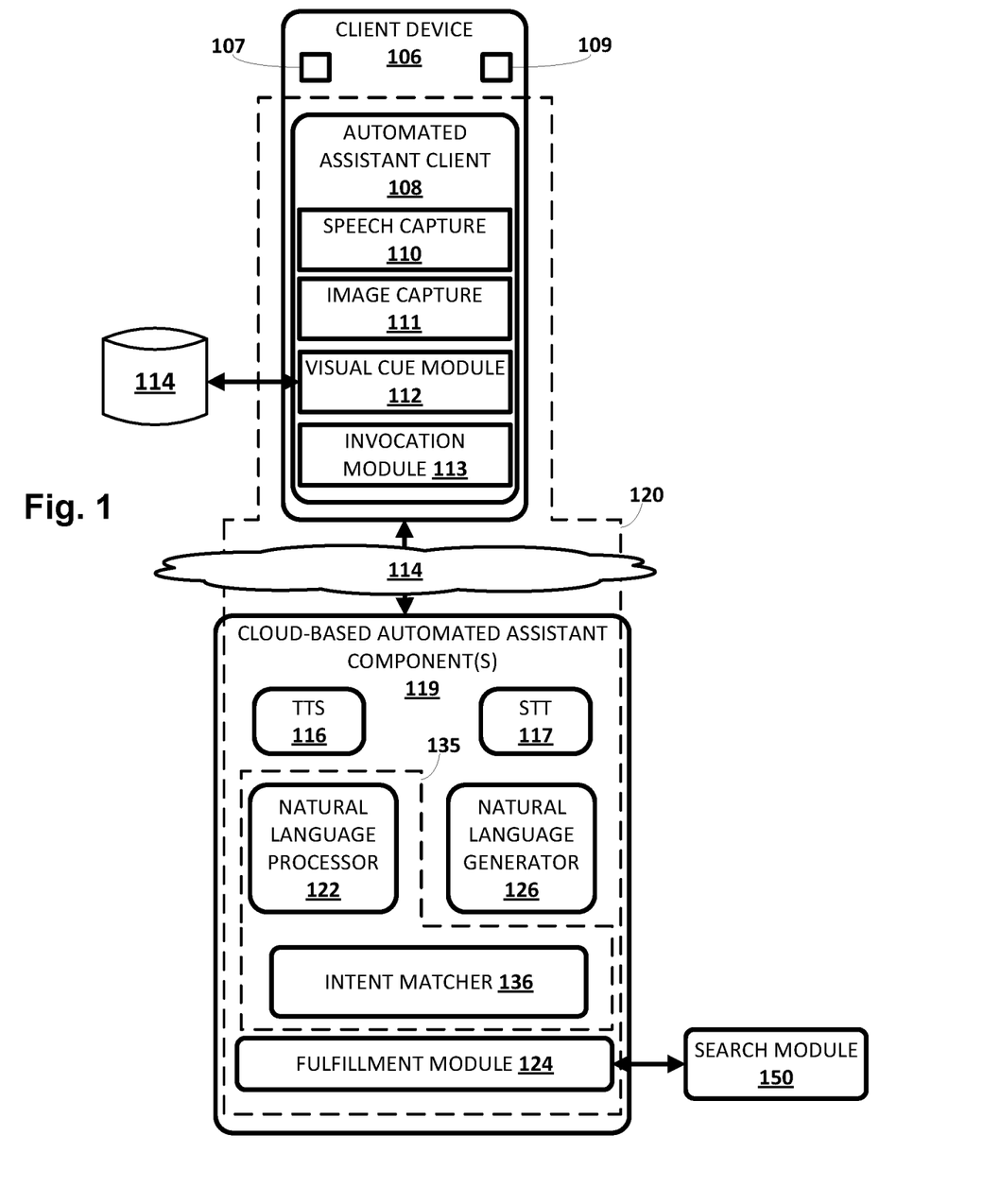
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108. One or more cloud-based automated assistant components 119, such as a natural language understanding module 135, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, some client devices 106 may take the form of assistant devices that are primarily designed to facilitate dialog between users and automated assistant 120 (e.g., standalone interactive speakers).

For purposes of this disclosure, client device 106 may be equipped with one or more vision sensors 107 having one or more fields of view. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module 112, to detect user-provided visual cues contained in the image frames. These visual cues may include but are not limited to hand gestures, gazes towards particular reference points, facial expressions, predefined movements by users, etc. These detected visual cues may be used for various purposes, and will be discussed further below.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may speak a predetermined invocation phrase, such as "OK, Assistant," or "Hey, Assistant," to cause automated assistant 120 to begin actively listening. Additionally or alternatively, in some implementations, automated assistant 120 may be invoked based on one or more detected visual cues, alone or in combination with uttered invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.).

In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108. In various implementations, automated assistant client 108 may include a speech capture module 110, the aforementioned image capture module 111, a visual cue module 112, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes, as will be described below. In various implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module 112, which may be implemented using any combination of hardware or software, may be configured to analyze one or more image frames provided by image capture module 111 to detect one or more visual cues captured in and/or across the one or more image frames. Visual cue module 112 may employ a variety of techniques to detect visual cues. For example, in FIG. 1, visual cue module 112 is communicatively coupled with a visual cue model database 114 (which may be integral with client device 106 and/or hosted remotely from client device 106, e.g., in the cloud). Visual cue model database 114 may include, for instance, one or more artificial intelligence (or machine learning) models that are trained to generate output indicative of detected user-provided visual cues in image frames.

As one non-limiting example, a neural network such as a convolutional neural network may be trained (and stored in database 114) such that one or more image frame(s)—or a feature vector extracted from the image frame(s)—may be applied as input across the neural network. In various implementations, the convolutional neural network may generate output indicative of a plurality of detected visual cues and associated probabilities that each visual cue was detected. In some such implementations, the output may further indicate a location in the image frame(s) in which the visual cue was detected, although this is not required. Such a convolutional neural network may be trained using training examples in various forms, such as sequences image frames (or feature vectors generated therefrom) labeled with gestures that are known to be contained in/across the sequence of image frames. When a training example is applied across the network, a difference between the generated output and the label associated with the training example may be used, e.g., to minimize a loss function. Various weights of the convolutional neural network may then be adjusted, e.g., using standard techniques such as gradient descent and/or back propagation.

In various implementations, visual cue module 112 may be configured to perform selected aspects of the present disclosure to reduce and/or eliminate false positive visual cues. For example, visual cue module 112 may engage in what was described previously as "excluded region classification" in which it analyzes one or more image frames captured by vision sensor 107 to classify one or more regions within a field of view of vision sensor 107 as being likely sources of visual noise that could cause detection of false positive visual cues. These regions may include regions with television screens, computer monitors, photographs (e.g., digital photographs in LCD/LED picture frames and/or still photographs printed on paper), and so forth. Visual cue module 112 may employ a variety of different techniques to detect regions of potential noise.

For example, in some implementations, visual cue module 112 may employ a variety of object recognition techniques to recognize potentially-noise-creating objects such as televisions and computer monitors (televisions, computer monitors, smartphone screens, tablet screens, smart watch screens, or other similar displays that render digital images and/or video may be collectively referred to as "electronic displays"). Once these objects are detected, they may be used, e.g., by visual cue module 112, to classify regions of interest that contain those detected objects, and therefore are likely sources of visual noise that could cause detection of false positive visual cues.

Various object recognition techniques may be employed by visual cue module 112, such as approaches that relay on computer-aided design ("CAD") models, machine learning techniques (e.g., using trained convolutional neural networks), feature-based methods (e.g., surface patches, linear edges), appearance based methods (e.g., edge matching, divide-and-conquer, gradient matching, histograms, etc.), genetic algorithms, and so forth. Additionally or alternatively, for objects such as televisions or computer screens, other techniques may be employed to recognize these objects. In some implementations, a television may be identified in a sequence of image frames based on a display frequency of the television. Suppose the sequence of image frames is captured at twice the frequency rate of the television. In every other image frame of the sequence of image frames, a new image would appear on the television. This may be detected and used to determine an ROI of the television.

When subsequent image frames are captured by vision sensor 107 of client device 106, regions of those subsequent image frames that were previously classified as being likely sources of visual noise may be dealt with in various ways. In some implementations those regions may simply be ignored (e.g., analysis of those subsequent image frames may refrain from analyzing those regions). Additionally or alternatively, in some implementations, candidate visual cues (e.g., hand gestures, gazes, etc.) detected in those classified regions may be weighted less heavily than, for instance, candidate visual cues detected elsewhere in the subsequent image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

In various implementations, invocation module 113 may be configured to determine whether to invoke automated assistant 120, e.g., based on output provided by speech capture module 110 and/or visual cue module 112 (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding) in conjunction with one or more visual cues detected by visual cue module 112. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, such as "OK assistant," that utterance may nonetheless be accepted as an invocation when detected in conjunction with a visual cue (e.g., hand waving by the speaker, speaker gazes directly into vision sensor 107, etc.).

In some implementations, an on-device invocation model may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or extracted feature vector) of an utterance from a user, as well as data indicative of one or more image frames and/or detected visual cues captured contemporaneously with the utterance.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to natural language understanding module 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues. For example, suppose two candidate textual interpretations have similar confidence scores. With conventional automated assistants 120, the user may be asked to disambiguate between these candidate textual statements. However, with automated assistants 120 configured with selected aspects of the present disclosure, one or more detected visual cues may be used to "break the tie."

Automated assistant 120 (and in particular, cloud-based automated assistant components 119) may include a natural language understanding module 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of natural language understanding module 135 processes natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node, which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding module 135 may also include an intent matcher 136 that is configured to determine an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" module 135.

Intent matcher 136 may use various techniques to determine an intent of the user, e.g., based on output from natural language processor 122 (which may include annotations and terms of the natural language input) and/or based on output from visual cue module 113. In some implementations, intent matcher 136 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 136 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue module 112. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 119. One kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment module 124 may be configured to receive the predicted/estimated intent that is output by intent matcher 136, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 124. As will be described below, the fulfillment information may in some implementations be provided to a natural language generator ("NLG" in some Figs.) 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from natural language understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
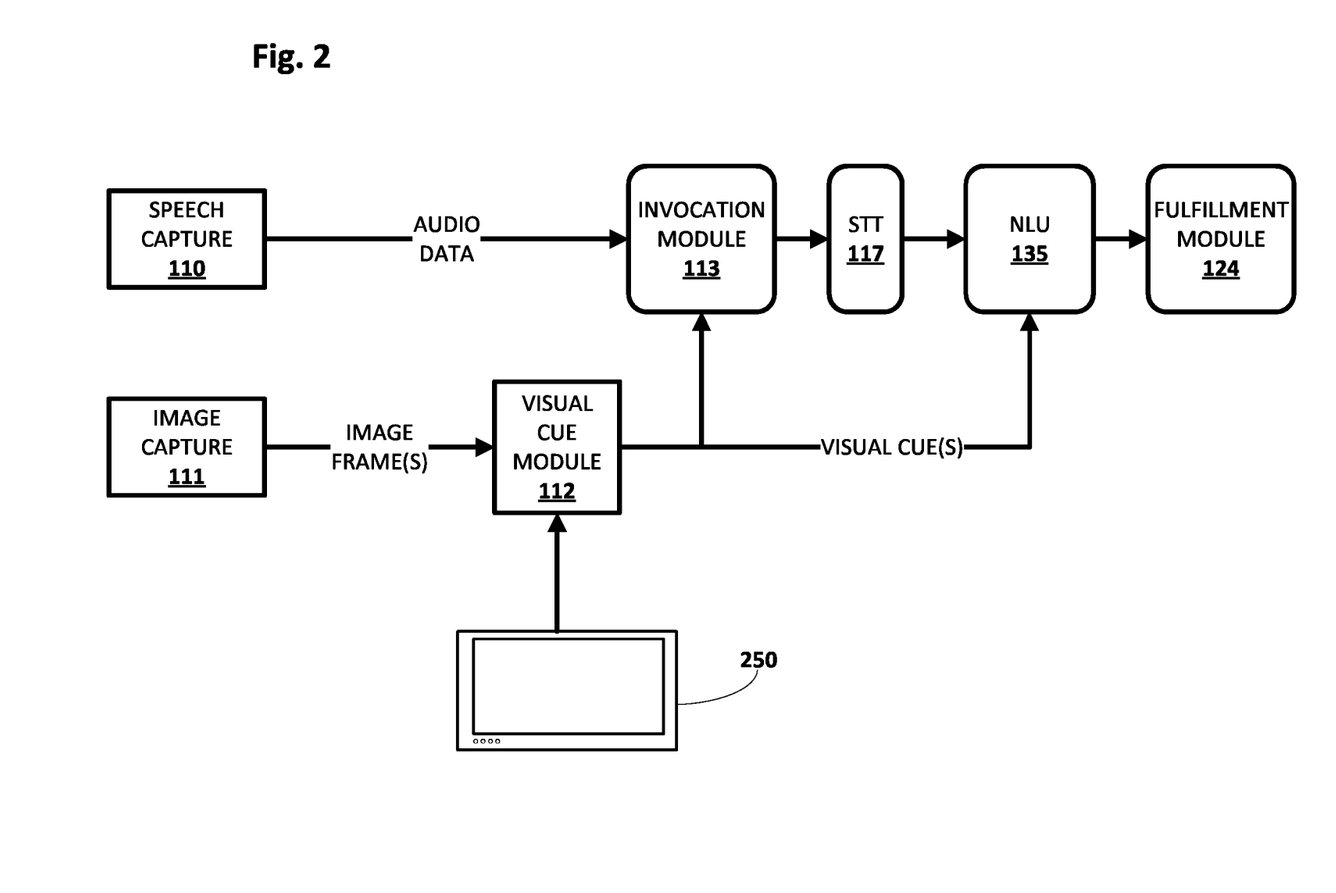
FIG. 2 depicts an example process flow that demonstrates various aspects of the present disclosure, in accordance with various implementations.

FIG. 2 demonstrates an example of how a combination of output from speech capture module 110 and image capture module 111 may be processed through the various components of FIG. 1, in accordance with various implementations. Components that are relevant to techniques described herein are depicted, but this is not meant to be limiting, and various other components not depicted in FIG. 2 may nonetheless be deployed. The operations illustrated by FIG. 2 are assumed to occur after excluded region classification has already been performed.

Starting on the left, speech capture module 110 may provide, to invocation module 113, audio data. As noted above this audio data may include an audio recording of a user's utterance, an embedding generated from the audio recording, a feature vector generated from the audio recording, etc. At or around the same time (e.g., contemporaneously, as part of the same set of actions), image capture module 111 may provide data indicative of one or more image frames to visual cue module 112. The data indicative of the one or more image frames may be the raw image frame data, a reduced dimensionality embedding of the raw image frame data, etc.

Visual cue module 112 may analyze the data indicative of the image frame(s) to detect visual cue(s). As described previously, visual cue module 112 may ignore, or assign less weight to, visual cues detected in regions previously classified as likely to contain visual noise. In some implementations, visual cue module 112 may receive one or more signals from a television 250 (or more generally, an electronic display) in a field of view of vision sensor 107 indicating a state. These signals indicating state may be provided, for instance, using one or more computer networks. If the television's state is OFF, then the region of the vision sensor's field of view that contains the television may not be ignored or weighted less heavily, and instead may be processed normally. If the television's state is ON, however, then the region of the vision sensor's field of view that contains the television may be ignored or weighted less heavily than other regions.

In some implementations, the audio data provided by speech capture module 110 and one or more visual cues detected by visual cue module 112 may be provided to invocation module 113. Based on these inputs, invocation module 113 may determine whether automated assistant 120 should be invoked. For example, suppose the user's utterance of an invocation phrase was not recorded clearly, e.g., due to ambient noise. That noisy utterance alone might not be sufficient to invoke automated assistant 120. However, if invocation module 113 determines that a visual cue in the form of the user gazing directly at vision sensor 107 was also detected, e.g., contemporaneously with the capture of the utterance, invocation module 113 may determine that invocation of automated assistant 120 is proper.

As noted previously, use of visual cues is not limited to invocation of automated assistant 120. In various implementations, visual cues may be used, in addition to or instead of for invoking automated assistant 120, to cause automated assistant 120 to take various responsive actions. In FIG. 2, the visual cue(s) detected by visual cue module 112 may be provided to other components of automated assistant 120, such as natural language understanding engine 135. Natural language understanding engine 135, e.g., by way of natural language processor 122, may utilize the visual cue(s) for various purposes, such as entity tagging (e.g., the user holds up a picture of a celebrity or public figure in the newspaper and says, "who is this?"), etc. Additionally or alternatively, natural language understanding engine 135, e.g., by way of intent matcher 136, may use the visual cue(s), alone or in combination with speech recognition output generated by STT module 117 and annotated by natural language processor 122, to identify a user's intent. This intent may then be provided to fulfillment module 124, which as described previously may take various actions to fulfill the intent.

Figure 3:
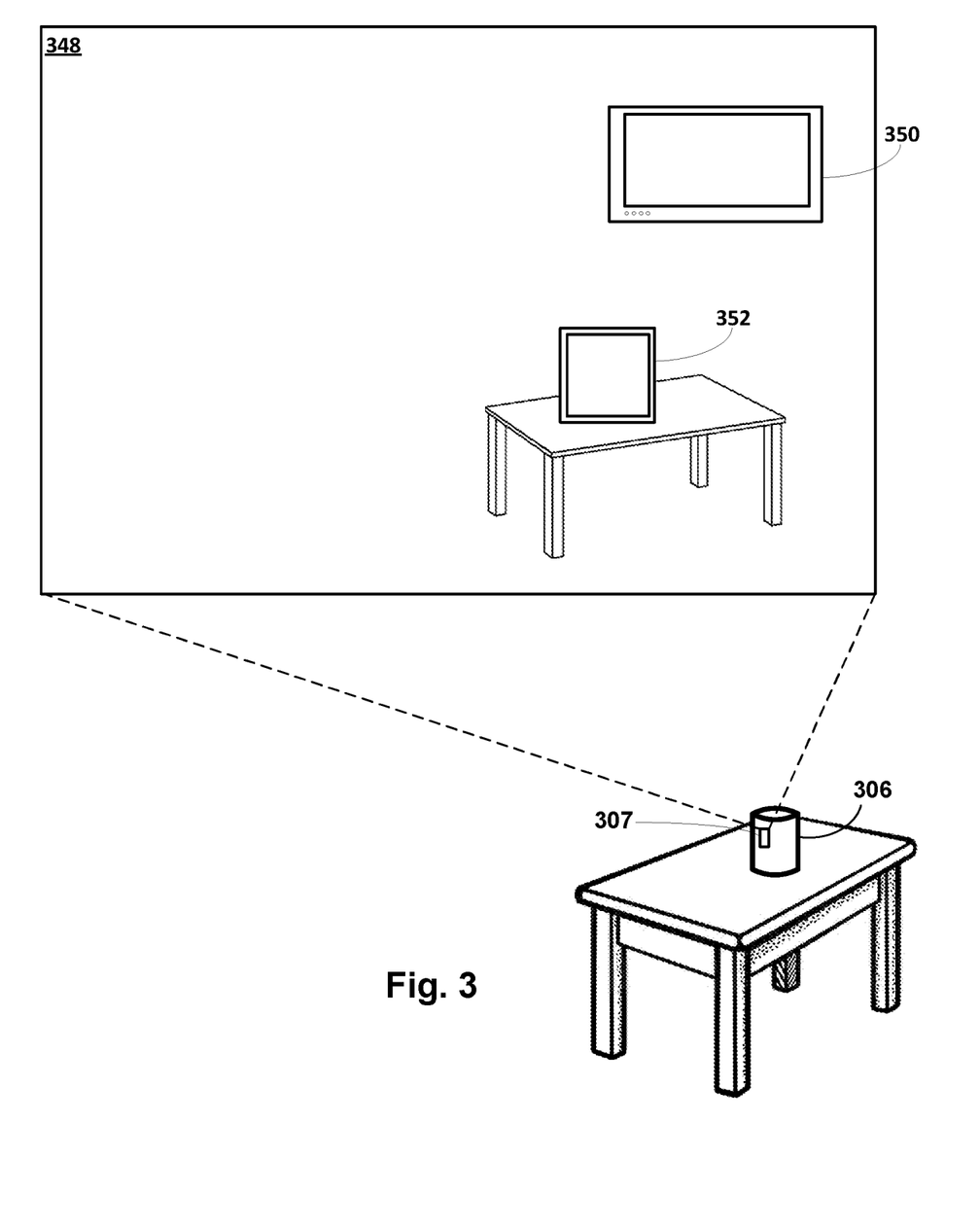
FIG. 3 depicts an example of what a field of view of a vision sensor of an assistant device may contain.

FIG. 3 depicts an example field of view 348 of a vision sensor 307 of an assistant device 306 configured with selected aspects of the present disclosure. It can be seen that a television 350 and a picture frame 352 are visible within field of view 348. These are both potential sources of visual noise that might raise false positives of visual cues. For example, television 350 might render video showing one or more individuals making gestures, looking into the camera, etc., any of which could be misinterpreted as visual cues. Picture frame 352 may be a non-electric frame that simply houses a printed picture or may be an electronic picture frame that renders one or more images stored in its memory. Assuming a picture contained in or rendered by picture frame 352 includes, for instance, a person gazing directly at a camera, that person's gaze might be misinterpreted as a visual cue. While not depicted in FIG. 3, other sources of potential visual noise might include electronic displays such as monitors associated with laptop computers, tablet computers, smartphone screens, smart watch screens, screens associated with other assistant devices, etc.

Figure 4:
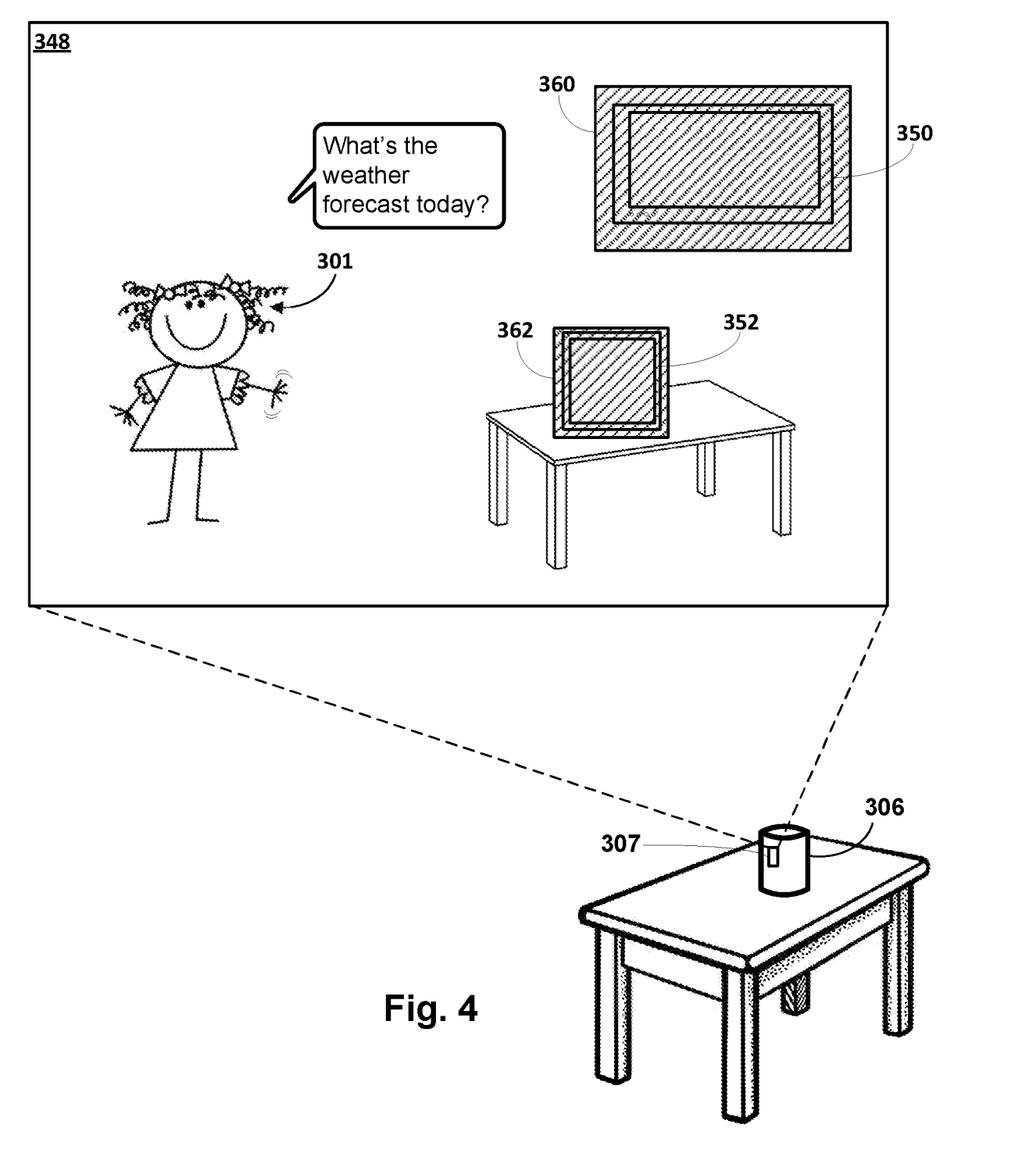
FIG. 4 depicts an example of the image frame of FIG. 3 with regions of interest classified as likely to contain visual noise and/or unlikely to contain visual cues, in accordance with various implementations.

One or more image frames may be captured, e.g., by vision sensor 307, which may correspond to field of view 348 of vision sensor 307. These image frames may be analyzed, e.g., by visual cue module 112, to identify regions likely to contain visual noise, such as regions containing television 350 and picture frame 352. The visual cue module 112 may recognize such objects as part of its analysis of the image frames and identify the regions accordingly. Once these regions are identified, visual cue module 112 may generate corresponding regions of interest that contain the potential sources of visual noise. For example, FIG. 4 depicts the same field of view 348 as FIG. 3. However, in FIG. 4, regions of interest 360 and 362 have been generated to contain, respectively, television 350 and picture frame 352. These regions of interest 360-362 may be classified as likely to contain visual noise (or unlikely to contain visual cues). For example, the regions of interest may be assigned a visual noise probability which is above a particular threshold. Additionally or alternatively, the regions of interest may be associated with a visual noise indicator (which may, for example, indicate that the visual noise probability is above the threshold).

Consequently, they may be ignored, and/or visual cues detected within these regions may be weighted less heavily than visual cues detected elsewhere in field of view 348.

Figure 5:
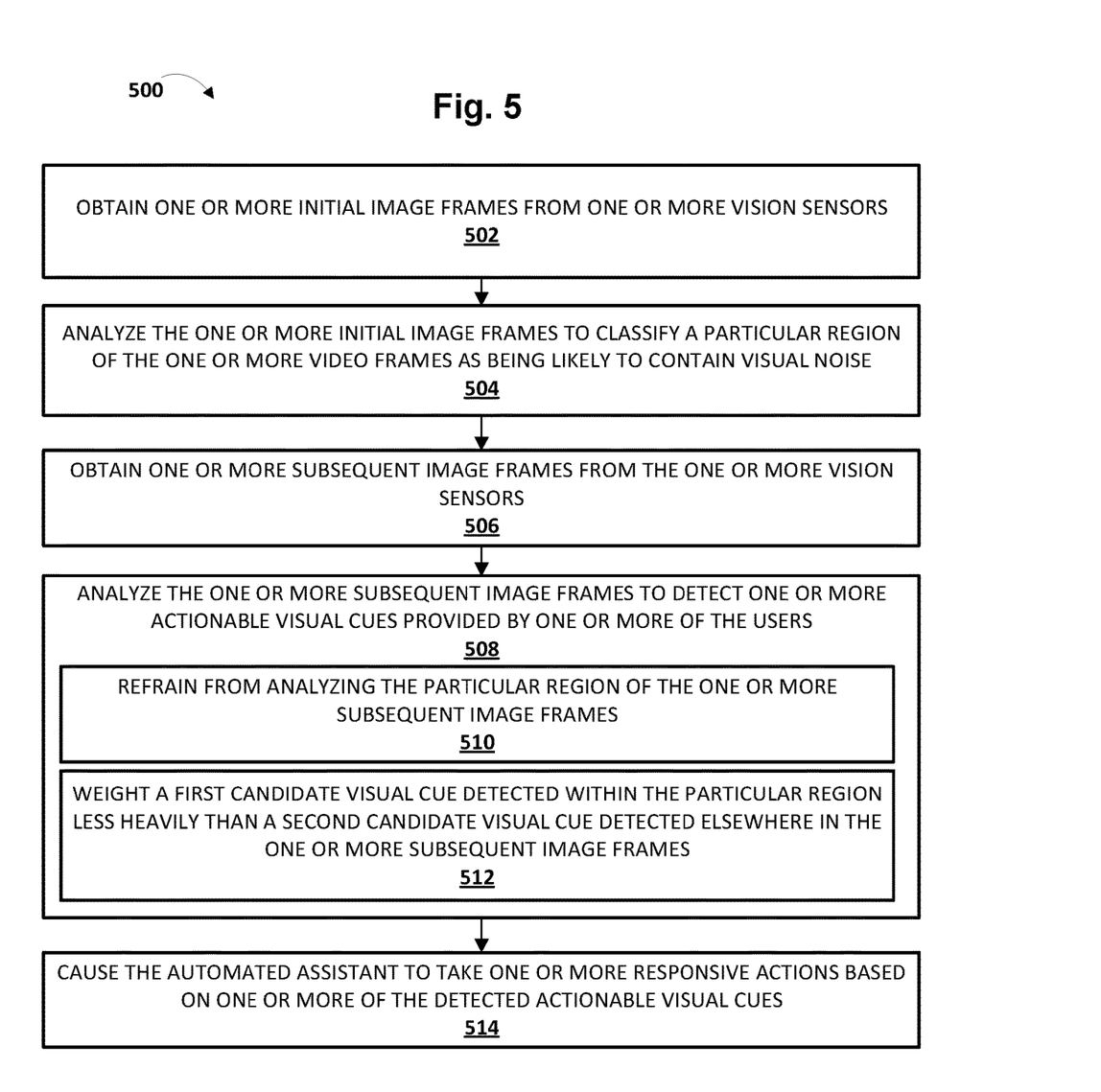
FIG. 5 depicts a flowchart illustrating an example method according to implementations disclosed herein.

FIG. 5 is a flowchart illustrating an example method 500 according to implementations disclosed herein. For convenience, the operations of the flow chart are described with reference to a system that performs the operations. This system may include various components of various computer systems, such as one or more components of computing systems that implement automated assistant 120. Moreover, while operations of method 500 are shown in a particular order, this is not meant to be limiting. One or more operations may be reordered, omitted or added.

At block 502, the system, e.g., by way of image capture module 111, may obtain one or more initial image frames from one or more vision sensors (e.g., 107). These initial image frames may be captured for the purposes of excluded region classification. At block 504, the system, e.g., by way of visual cue module 113, may analyze the one or more initial image frames to classify a particular region of the one or more video frames as being a likely source of visual noise and/or unlikely to contain a visual cue. The operation(s) of block 504 may constitute the excluded region classification described herein. At block 506, the system, e.g., by way of image capture module 111, may obtain one or more subsequent image frames from the one or more vision sensors. These image frames may be obtained after the excluded region classification.

At block 508, the system may analyze the one or more subsequent image frames to detect one or more actionable visual cues provided by one or more of the users. In some implementations, this analysis may include, at block 510, refraining from analyzing, in the one or more subsequent image frames, the particular region(s) classified as being a likely source of visual noise and/or unlikely to contain a visual cue. For example, image data (e.g., RGB pixels) from the particular region(s) may not be applied as input across one of the aforementioned machine learning models (e.g., convolutional neural networks) that are trained to detect visual cues.

Additionally or alternatively, in some implementations, the analysis of block 508 may include, at block 512, weighting, e.g., by visual cue module 113 and/or intent matcher 136, a first candidate visual cue detected within the particular region of the one or more subsequent image frames less heavily than a second candidate visual cue detected elsewhere in the one or more subsequent image frames. For example, suppose a television contained in a first region of a vision sensor's field of view renders a sequence of images depicting a person waving (assume waving is a predetermined visual cue that elicits a response from automated assistant 120). Suppose further that a user in a second, different region of the vision sensor's field of view also makes a gesture, e.g., by forming a "figure eight" with his or her hands. Normally these gestures may be more or less equally indicative of a user intent, and thus automated assistant 120 might become confused as to which it should attempt to fulfill. However, because the hand waving was detected in a region classified as being likely to contain visual noise (i.e., the region of interest containing the television), the hand waving may be assigned less weight as a candidate visual cue than the figure eight gesture. Accordingly, the figure eight gesture may be more likely to elicit a response from automated assistant 120.

While this example illustrates selecting from multiple candidate visual cues based on their respective weights, this is not meant to be limiting. In various implementations, a single candidate visual cue may be compared, for instance, to a predetermined threshold to determine whether it should elicit a response from automated assistant 120. Thus, for instance, a visual cue detected in a region of an image frame classified as likely containing visual noise may be assigned a weight that fails to satisfy a confidence threshold. Consequently, the visual cue might not elicit a response from automated assistant 120. This prevents or reduces false positives generated from, for example, someone on television who just so happens to make a gesture that corresponds to an actionable visual cue.

Additionally or alternatively, in some cases, a single visual cue may, across a sequence of image frames, be detected in multiple regions of a vision sensor's field of view, some of these regions classified as likely to contain visual noise, and others unclassified. In some such implementations, the combined confidences that the visual cue was detected in both regions—with the detected cue from the classified region contributing less—may be compared to a threshold to determine that the visual cue satisfies some predetermined threshold to elicit a response from automated assistant 120.

Referring back to FIG. 5, at block 514, the system may cause one or more responsive actions to be taken by, or on behalf of, automated assistant 120 based on one or more of the detected actionable visual cues. These responsive actions may include invoking automated assistant 120. For example, invocation module 113 may determine that the actionable visual cue, alone or in combination with an utterance provided by the user, suffices to invoke automated assistant 120 so that the user is able to make an additional request to automated assistant 120. Additionally or alternatively, in some implementations, a visual cue of a user gazing directly into camera 107 of client device 106 while speaking may be a strong indicator that automated assistant 120 should be invoked (and possibly take action on whatever the user is saying).

Additionally or alternatively, the responsive actions may include various responsive actions that might be taken by automated assistant 120 after it has already been invoked, e.g., as a normal part of a human-to-computer dialog. In some implementations, various actions may be preassigned or mapped to particular visual cues, alone or in combination with vocal utterances. As a non-limiting example, a visual cue in the form of a user giving a "thumbs up" may be used in combination with the utterance "How do I get to <location>" to cause automated assistant 120 to retrieve information about getting to the location using public transportation. By contrast, a visual cue in the form of a user pantomiming operation of a steering wheel may be used in combination with the same utterance to cause automated assistant 120 to retrieve driving directions to the location. In some implementations, users may create custom mappings between visual cues and various actions. For example, a user could say something like, "OK Assistant, when I look at you and blink three times, play Jingle Bells." A mapping may be created, e.g., in a database available to intent matcher 136, that subsequently is used anytime the visual cue of three blinks is detected.

Figure 6:
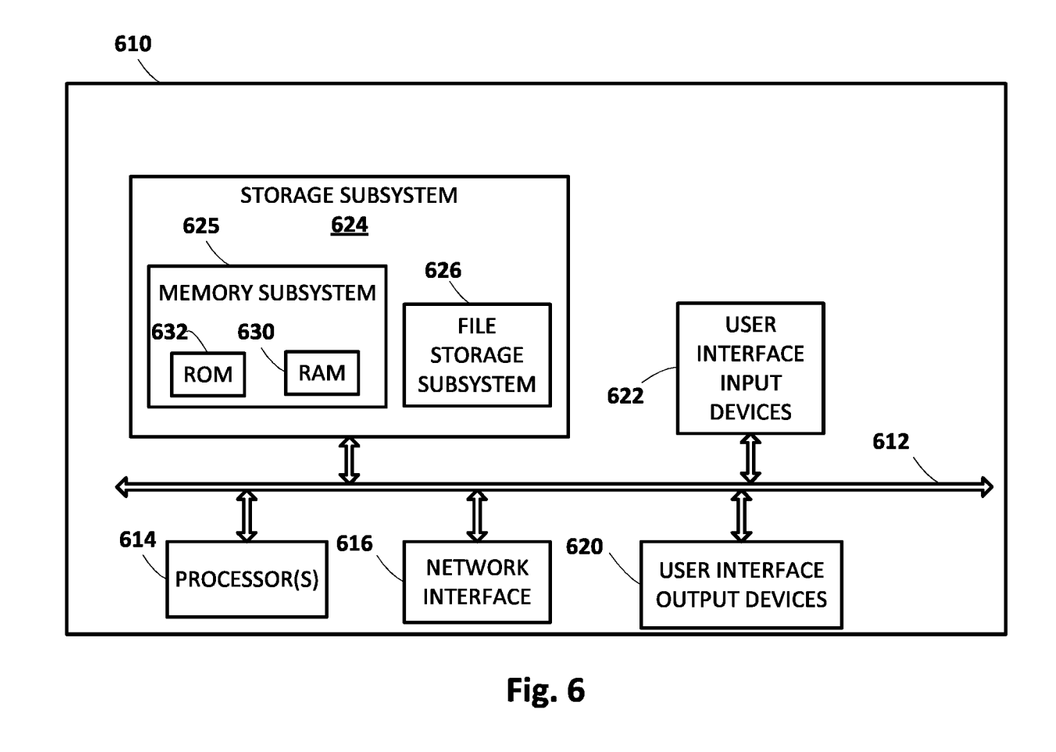
FIG. 6 illustrates an example architecture of a computing device.

FIG. 6 is a block diagram of an example computing device 610 that may optionally be utilized to perform one or more aspects of techniques described herein. In some implementations, one or more of a client computing device, user-controlled resources module 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of assistant devices attempting to detect visual cues, e.g., by disabling vision sensor 107.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors that facilitate touch-free interaction between one or more users and an automated assistant, the method comprising:
   obtaining one or more initial image frames from one or more vision sensors;
   analyzing the one or more initial image frames to classify a particular region of the one or more initial image frames as likely to contain visual noise, wherein analyzing the one or more initial image frames includes detecting an electronic display captured in the one or more initial image frames, wherein the particular region of the one or more initial image frames contains the detected electronic display;
   obtaining one or more subsequent image frames from the one or more vision sensors;
   determining whether the electronic display was rendering graphics while the one or more subsequent image frames were obtained;
   analyzing the one or more subsequent image frames to detect one or more actionable visual cues provided by one or more of the users, wherein analyzing the one or more subsequent image frames includes:
      in response to a determination that the electronic display was rendering graphics:
         refraining from analyzing the particular region of the one or more subsequent image frames, or
         weighting a first candidate visual cue detected within the particular region of the one or more subsequent image frames less heavily than a second candidate visual cue detected elsewhere in the one or more subsequent image frames,
      in response to a determination that the electronic display was not rendering graphics:
         analyzing the particular region of the one or more subsequent image frames or weighting the first candidate visual cue equally to the second candidate visual cue; and
   causing the automated assistant to take one or more responsive actions based on one or more of the detected actionable visual cues.

2. The method of claim 1, wherein the electronic display is detected using an object recognition process.

3. The method of claim 1, wherein determining whether the electronic display was rendering graphics includes detecting a display frequency of the electronic display.

4. The method of claim 1, wherein the one or more responsive actions include invocation of the automated assistant, and the automated assistant is invoked based on the one or more detected actionable visual cues in conjunction with an utterance from one or more of the users.

5. The method of claim 1, wherein the one or more responsive actions include invocation of the automated assistant, and the automated assistant is invoked solely based on the one or more detected actionable visual cues.

6. The method of claim 1, wherein the one or more detected actionable visual cues include one or more of a user looking towards a reference point, a user making a hand gesture, a user having a particular facial expression, or a position of the user within the one or more subsequent image frames.

7. The method of claim 1, wherein analyzing the one or more initial image frames to classify the particular region of the one or more initial image frames as likely to contain visual noise comprises:
   associating the particular region of the one or more initial image frames with a visual noise indicator.

8. A system comprising one or more processors and memory operably coupled with the one or more processors, wherein the memory stores instructions that, in response to execution of the instructions by one or more processors, cause the one or more processors to perform the following operations:

obtaining one or more initial image frames from one or more vision sensors;

analyzing the one or more initial image frames to classify a particular region of the one or more initial image frames as being likely to contain visual noise, wherein analyzing the one or more initial image frames includes detecting an electronic display captured in the one or more initial image frames, wherein the particular region of the one or more initial image frames contains the detected electronic display;

obtaining one or more subsequent image frames from the one or more vision sensors;

determining whether the electronic display was rendering graphics while the one or more subsequent image frames were obtained;

analyzing the one or more subsequent image frames to detect one or more actionable visual cues provided by one or more of the users, wherein analyzing the one or more subsequent image frames includes:

in response to a determination that the electronic display was rendering graphics:

refraining from analyzing the particular region of the one or more subsequent image frames, or weighting a first candidate visual cue detected within the particular region of the one or more subsequent image frames less heavily than a second candidate visual cue detected elsewhere in the one or more subsequent image frames, in response to a determination that the electronic display was not rendering graphics:

analyzing the particular region of the one or more subsequent image frames or weighting the first candidate visual cue equally to the second candidate visual cue; and causing an automated assistant to take one or more responsive actions based on one or more of the detected actionable visual cues.

9. The system of claim 8, wherein the electronic display is detected using an object recognition process.

10. The system of claim 8, wherein determining whether the electronic display was rendering graphics includes detecting a display frequency of the electronic display.

11. The system of claim 8, wherein the one or more responsive actions include invocation of the automated assistant, and the automated assistant is invoked based on the one or more detected actionable visual cues in conjunction with an utterance from one or more of the users.

12. The system of claim 8, wherein the one or more responsive actions include invocation of the automated assistant, and the automated assistant is invoked solely based on the one or more detected actionable visual cues.

13. The system of claim 8, wherein the one or more detected actionable visual cues include one or more of a user looking towards a reference point, a user making a hand gesture, a user having a particular facial expression, or a position of the user within the one or more subsequent image frames.

14. The system of claim 8, wherein analyzing the one or more initial image frames to classify the particular region of the one or more initial image frames as likely to contain visual noise comprises:

associating the particular region of the one or more initial image frames with a visual noise indicator.

15. At least one non-transitory computer-readable medium comprising instructions that, in response to execution of the instructions by one or more processors, cause the one or more processors to perform the following operations:

obtaining one or more initial image frames from one or more vision sensors;

analyzing the one or more initial image frames to classify a particular region of the one or more initial image frames as being likely to contain visual noise, wherein analyzing the one or more initial image frames includes detecting an electronic display captured in the one or more initial image frames, wherein the particular region of the one or more initial image frames contains the detected electronic display;

obtaining one or more subsequent image frames from the one or more vision sensors;

determining whether the electronic display was rendering graphics while the one or more subsequent image frames were obtained;

analyzing the one or more subsequent image frames to detect one or more actionable visual cues provided by one or more of the users, wherein analyzing the one or more subsequent image frames includes:

in response to a determination that the electronic display was rendering graphics:

refraining from analyzing the particular region of the one or more subsequent image frames, or weighting a first candidate visual cue detected within the particular region of the one or more subsequent image frames less heavily than a second candidate visual cue detected elsewhere in the one or more subsequent image frames, in response to a determination that the electronic display was not rendering graphics:

analyzing the particular region of the one or more subsequent image frames or weighting the first candidate visual cue equally to the second candidate visual cue; and causing an automated assistant to take one or more responsive actions based on one or more of the detected actionable visual cues.

* * * * *